United States Patent
Yoshimoto

(10) Patent No.: US 12,428,074 B2
(45) Date of Patent: Sep. 30, 2025

(54) VEHICLE FRONT PORTION STRUCTURE

(71) Applicant: TOYOTA JIDOSHA KABUSHIKI KAISHA, Aichi-ken (JP)

(72) Inventor: Masanori Yoshimoto, Okazaki (JP)

(73) Assignee: TOYOTA JIDOSHA KABUSHIKI KAISHA, Aichi-Ken (JP)

( * ) Notice: Subject to any disclaimer, the term of this patent is extended or adjusted under 35 U.S.C. 154(b) by 425 days.

(21) Appl. No.: 18/307,803

(22) Filed: Apr. 27, 2023

(65) Prior Publication Data

US 2024/0075991 A1 Mar. 7, 2024

(30) Foreign Application Priority Data

Apr. 28, 2022 (JP) .................. 2022-074830

(51) Int. Cl.
*B62D 25/20* (2006.01)
(52) U.S. Cl.
CPC ................. *B62D 25/2018* (2013.01)
(58) Field of Classification Search
CPC ...... B60R 16/02; B62D 21/04; B62D 21/152; B62D 25/08; B62D 25/082; B62D 25/088; B62D 25/20; B62D 25/2018
See application file for complete search history.

(56) References Cited

U.S. PATENT DOCUMENTS

2018/0370569 A1 12/2018 Madasamy et al.
2020/0047696 A1* 2/2020 Atsumi ................ B62D 25/084

FOREIGN PATENT DOCUMENTS

| JP | 2003-306171 A | 10/2003 |
| JP | 2005-186727 A | 7/2005 |
| JP | 2017-136921 A | 8/2017 |
| JP | 2021-104762 A | 7/2021 |

* cited by examiner

*Primary Examiner* — Lori Lyjak
(74) *Attorney, Agent, or Firm* — HAUPTMAN HAM, LLP

(57) ABSTRACT

A vehicle front portion structure includes: front side members that are disposed on both sides of a vehicle front portion in a vehicle width direction, and extend in a front-rear direction to support a floor of a cabin; a high voltage component that is disposed below the floor; and support members having rear end portions joined to the front side members and extending obliquely forward and downward from the front side members, respectively.

2 Claims, 2 Drawing Sheets

VEHICLE FRONT PORTION STRUCTURE

CROSS REFERENCE TO RELATED APPLICATION

This application claims priority to Japanese Patent Application No. 2022-074830 filed on Apr. 28, 2022, which is incorporated herein by reference in its entirety including the specification, claims, drawings, and abstract.

TECHNICAL FIELD

The present disclosure relates to a vehicle front portion structure including, on both sides in a vehicle width direction, front side members extending in a front-rear direction.

BACKGROUND

JP 2003-306171 A discloses a vehicle front portion structure including, on both sides in a vehicle width direction, front side members extending in a front-rear direction.

SUMMARY

In a case where a high voltage component such as a traveling electric motor is disposed below a floor of a cabin, when a gap between the floor of the cabin and the high voltage component is narrow, a front side member is deformed so as to be bent downward when a head-on collision of a vehicle occurs, and thus the floor of the cabin supported by the front side member may come into contact with the high voltage component, damaging the high voltage component.

Accordingly, an object of the present disclosure is to prevent the front side member from being deformed so as to be bent downward when the head-on collision of the vehicle occurs, and to prevent the high voltage component disposed below the floor of the cabin from being damaged.

A vehicle front portion structure according to the present disclosure includes: front side members that are disposed on both sides of a vehicle front portion in a vehicle width direction, and extend in a front-rear direction to support a floor of a cabin; a high voltage component that is disposed below the floor; and support members having rear end portions joined to the front side members and extending obliquely forward and downward from the front side members, respectively.

In the present disclosure, since an upward load is transmitted from the support members to the front side members when a head-on collision of a vehicle occurs, it is possible to prevent the front side members from being deformed so as to be bent downward, and prevent the high voltage component from being damaged due to contact with the floor of the cabin.

In one aspect of the vehicle front portion structure according to the present disclosure, front ends of the support members may be disposed respectively forward of front ends of the front side members.

According to the present disclosure, it is possible to prevent the front side members from being deformed so as to be bent downward when the head-on collision of the vehicle occurs, and to prevent the high voltage component disposed below the floor of the cabin from being damaged.

BRIEF DESCRIPTION OF DRAWINGS

Embodiment(s) of the present disclosure will be described based on the following figures, wherein.

DESCRIPTION OF EMBODIMENTS

Hereinafter, a vehicle front portion structure 10 according to the present embodiment will be described with reference to FIGS. 1 and 2. An arrow FR, an arrow UP, and an arrow RH illustrated in FIGS. 1 and 2 indicate a forward direction (traveling direction), an upward direction, and a rightward direction of a vehicle, respectively. The directions opposite to the arrows FR, UP, and RH indicate a rearward direction, a downward direction, and a leftward direction of the vehicle, respectively. In the following description, unless otherwise specified, a front-rear direction, a left-right direction, and an up-down direction, which are simply used for the description, refer to front-rear in a vehicle front-rear direction, left-right in a vehicle left-right direction (vehicle width direction), and up-down in a vehicle up-down direction, respectively.

Figure 1:
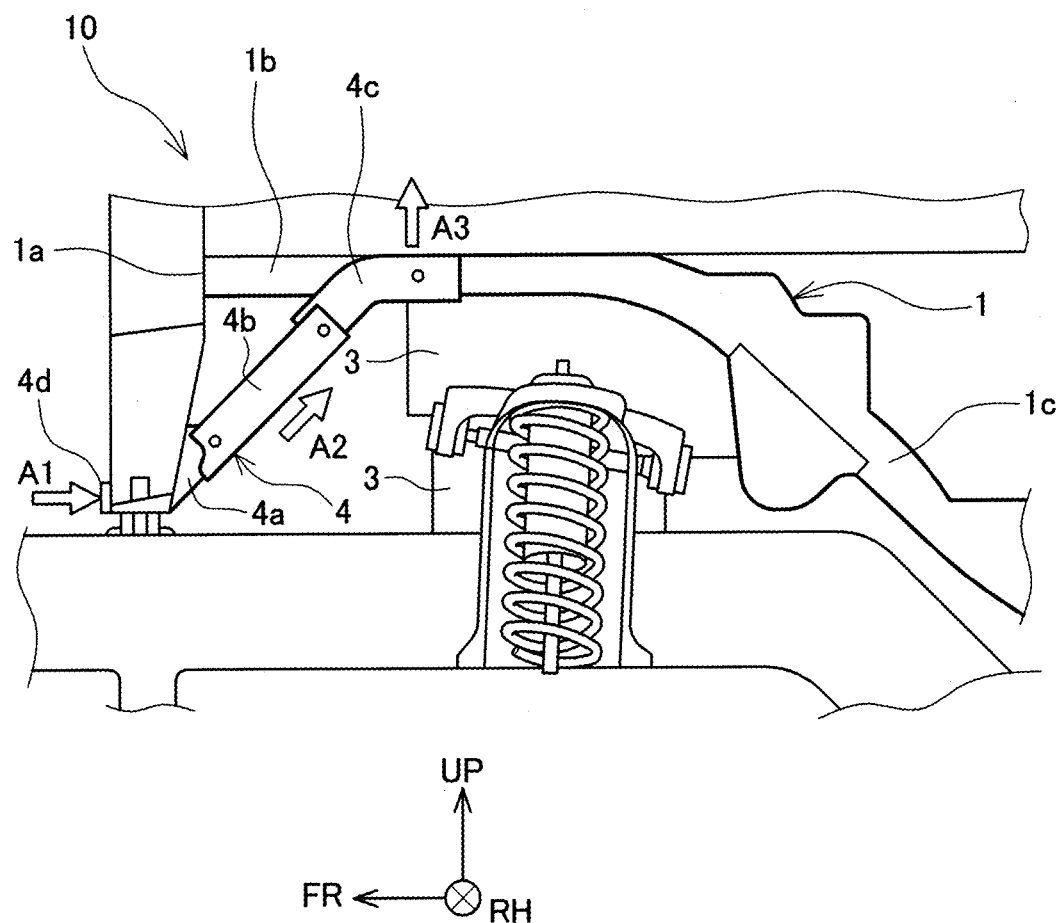
FIG. 1 is a side view of a vehicle front portion structure according to an embodiment of the present disclosure.
Figure 2:
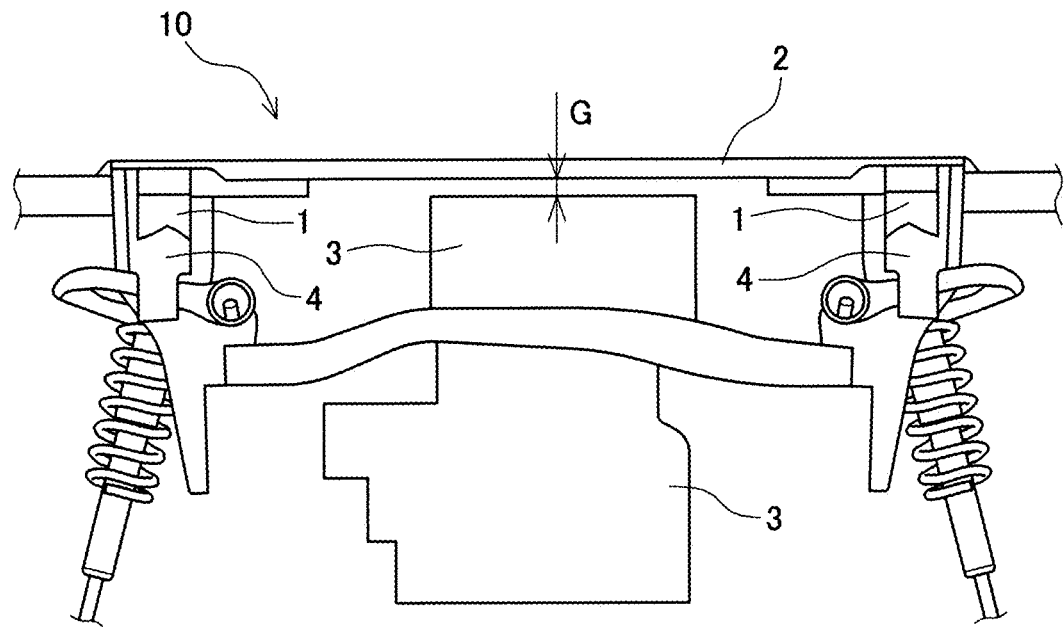
FIG. 2 is a front view of the vehicle front portion structure according to the present embodiment as viewed from the front.
Figure 2:
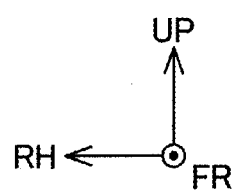

FIG. 1 is a side view of the vehicle front portion structure 10, and FIG. 2 is a front view of the vehicle front portion structure 10. As shown in FIGS. 1 and 2, the vehicle front portion structure 10 includes, on both sides in the vehicle width direction, front side members 1 extending in the front-rear direction as framework members of a vehicle front portion. Each front side member 1 includes a horizontal portion 1b extending rearward from a front end 1a, and an inclined portion 1c obliquely extending rearward and downward from a rear end of the horizontal portion 1b. The front side members 1 are joined to a floor 2 of a cabin, and support the floor 2 from below on both sides in the vehicle width direction.

The vehicle front portion structure 10 includes a high voltage component 3 disposed below the floor 2. The high voltage component 3 includes a traveling electric motor and a circuit such as an inverter. As shown in FIG. 2, a gap G having an extremely narrow width in the up-down direction is secured between the floor 2 and an upper end of the high voltage component 3.

The vehicle front portion structure 10 includes support members 4 as framework members that support the front side members 1 from below. Each support member 4 is joined to a central portion of the horizontal portion 1b of the front side member 1 in the front-rear direction, and extends obliquely forward and downward from the joining position. As shown in FIG. 1, the support member 4 includes a front end portion 4a, a middle portion 4b, and a rear end portion 4c, and the rear end portion 4c is joined to the horizontal portion 1b of the front side member 1.

A front end 4d of the front end portion 4a of the support member 4 is disposed forward of the front end 1a of the front side member 1. Therefore, when a head-on collision of a vehicle occurs, a load is applied to the support member 4 from the front, as indicated by an arrow A1 in FIG. 1, before the load is applied to the front side member 1 from the front. Then, the load is transmitted as indicated by an arrow A2 in FIG. 1, and the load is applied in a direction in which the front side member 1 is bent upward as indicated by an arrow A3 in FIG. 1. Therefore, in the vehicle front portion structure 10, even if the front side member 1 is deformed due to the head-on collision of the vehicle, the front side member 1 is always deformed so as to be bent upward, and it is possible to prevent the front side member 1 from being deformed so as to be bent downward. In addition, since it is possible to prevent the front side member 1 from being deformed so as to be bent downward in this way, the vehicle front portion structure 10 can prevent the floor 2 supported by the front side members 1 from being deformed so as to be bent downward in a side view when the head-on collision of the vehicle occurs, and can prevent the floor 2 from coming into contact with the high voltage component 3 and damaging the high voltage component 3.

In addition, since the vehicle front portion structure 10 has an effect of preventing the front side members 1 from being deformed so as to be bent downward simply by adding the support members 4 to the vehicle front portion structure in the related art, an increase in mass and cost can be minimized compared with a method of preventing bending of the front side member 1, by improving strength by increasing a plate thickness of the front side member 1 or changing a material of the front side member 1.

SUPPLEMENTARY OF EMBODIMENTS

The vehicle front portion structure of the present disclosure is not limited to the above embodiments, and can be implemented in various embodiments within the scope of the gist of the present disclosure. For example, the high voltage component disposed below the floor is not limited to the traveling electric motor, the inverter, or the like, and may be another component such as a compressor, a heater, or the like for air conditioning.

The invention claimed is:

1. A vehicle front portion structure comprising:
   front side members that are disposed on both sides of a vehicle front portion in a vehicle width direction, and extend in a front-rear direction to support a floor of a cabin;
   a high voltage component that is disposed below the floor; and
   support members having rear end portions joined to the front side members and extending obliquely forward and downward from the front side members, respectively.

2. The vehicle front portion structure according to claim 1, wherein
   front ends of the support members are respectively disposed forward of front ends of the front side members.

* * * * *